United States Patent [19]

Reuter

[11] Patent Number: 4,660,813
[45] Date of Patent: Apr. 28, 1987

[54] RUBBER MOUNTING WITH HYDRAULIC DAMPING, PARTICULARLY FOR MOUNTING VEHICLE ENGINES

[75] Inventor: Horst Reuter, Wachtberg-Oberbachem, Fed. Rep. of Germany

[73] Assignee: Boge GmbH, Eitorf, Fed. Rep. of Germany

[21] Appl. No.: 833,962

[22] Filed: Feb. 27, 1986

Related U.S. Application Data

[63] Continuation of Ser. No. 561,173, Dec. 14, 1983, abandoned.

[30] Foreign Application Priority Data

Dec. 14, 1982 [DE] Fed. Rep. of Germany ....... 3246205

[51] Int. Cl.$^4$ .............................................. F16F 1/36
[52] U.S. Cl. .................................. 267/140.1; 248/562; 248/634
[58] Field of Search ............... 188/298, 379; 248/562, 248/634, 636, 638; 267/8 R, 35, 113, 140.1, 140.2, 140.3, 140.4, 140.5; 280/710, 716

[56] References Cited

U.S. PATENT DOCUMENTS 4,159,091 6/1979 Le Salver et al. ................. 248/562
4,352,487 10/1982 Shtarkman ............................ 267/35
4,378,936 4/1983 Brenner ............................. 267/140.1
4,383,679 5/1983 Kakimoto ........................ 248/562 X
4,460,168 7/1984 Obadal .............................. 267/140.1

FOREIGN PATENT DOCUMENTS 0012638 3/1982 European Pat. Off. .
0027751 12/1982 European Pat. Off. .
143839 11/1981 Japan ................................. 267/140.1
2041485 9/1980 United Kingdom ............... 267/8 R Primary Examiner—George E. A. Halvosa
Attorney, Agent, or Firm—Nils H. Ljungman

[57] ABSTRACT

A hydraulic-damping rubber mounting for motor vehicles, particularly for engines of such vehicles, has two rigid end walls which are disposed opposite to each other in the axial direction, and at least two fluid chambers which are disposed axially one behind the other, for containing damping fluid. The chambers communicate with each other through a throttle means. A partitioning wall which delimits and separates the two chambers is axially movable, and is pressed against a sealing surface by way of a prestressed rubber spring so that, at large amplitudes, the reduced pressure which normally might cause cavitation in a chamber is eliminated by way of a bypass opened by stressing the rubber spring so as to open communication at the sealing surface, such that no interfering noise effects occur.

9 Claims, 3 Drawing Figures

RUBBER MOUNTING WITH HYDRAULIC DAMPING, PARTICULARLY FOR MOUNTING VEHICLE ENGINES

This application is a continuation of application Ser. No. 561,173, filed Dec. 14, 1983, now abandoned.

FIELD OF THE INVENTION

This invention relates to rubber mountings with hydraulic damping, in particular engine mountings for motor vehicles, having two rigid walls, usually end walls, which are disposed opposite to each other in the axial direction, and at least two chambers which are arranged axially one behind the other, containing damping fluid, of which at least one chamber has a generally peripheral wall which is formed as a rubber-elastic spring element such that the two end walls are resiliently interconnected and the volume of the chamber having the rubber-elastic peripheral wall varies with vibrations and flexure of the peripheral wall portion, and wherein the chambers communicate with each other by way of at least one throttle means, usually disposed in a partitioning wall which separates the two chambers.

BACKGROUND

Rubber mountings of this kind are used for mounting the drive units in vehicles of all types. In regard to mounting internal combustion engines in motor vehicles, the applicable considerations are to some extent in conflict. On the one hand, in order to avoid the transmission of noise, it is desirable or necessary to provide the softest possible mounting with a low level of natural damping, which however allows the movements of the engine, which are generated, for instance, by movement over the road surface, to become very great and almost go into a condition of free oscillation. On the other hand, the substantial movements of the engine can be reduced by using hard engine mountings or separate oscillation dampers, which, however, in turn results in a considerable amount of noise being transmitted to the body.

Rubber mountings of this general kind are known (for example, published European application No. 27,751 and published European application No. 12,638), which provide for generally good damping in the low-frequency range. The disadvantage however is that cavitation occurs in the chamber or chambers above a given amplitude of oscillation or a given frequency, and such cavitation results in the production of undesirable noise. Cavitation of that nature occurs when, in the event of substantial deflection movements, the damping fluid flows from one chamber into the other and a vacuum is formed on one side of the throttle means, as the fluid compensation effect cannot take place sufficiently quickly.

Cavitation of a liquid results when the pressure in a point in the liquid decreases to a value which is below the vapor pressure of the fluid. When the vapor pressure of a fluid is greater than the pressure at a point therein, the fluid changes from the fluid phase, that is, liquid phase, into the vapor phase. This change of phase is akin to boiling. The vapor will be produced during cavitation as long as the pressure within the fluid is below that of its vapor pressure. Of course, the vapor pressure of fluids within hydraulic damping equipment causes cavitation at pressures well below atmospheric pressure, that is, the fluids boil at operating temperatures.

In the newer and smaller motors, which are generally of four-cylinder design, the vibrations in the motor are at substantially half the frequency of the vibrations of an eight-cylinder motor running at the same number of revolutions per minute. Therefore, the frequency of excitation of the motor is at generally lower frequencies than in corresponding six- and eight-cylinder motors. Furthermore, low frequency vibrations especially during start-up and shut-down of the engine are more prevalent because of the inherent nature of the lower frequencies of vibration due to the smaller number of piston explosions, etc. Additionally, the relative weight of the pistons to the entire engine in a four-cylinder motor are generally greater than in a larger motor. A four-cylinder motor generates greater amplitudes of vibration. Since these greater amplitudes of vibration are at a lower frequency, as is well known in the vibration theory, these lower frequency vibrations will have greater amplitudes than similar higher frequency vibrations of similar energy, because the low pass characteristics of a smaller engine are not as highly filtered as those of a larger engine. Therefore, in smaller engines which are lighter in weight and do not damp out the frequencies of oscillation the same way that larger motors with a greater number of cylinders do, the danger of cavitation in the engine mounts is greater. Because of the problems which have developed in the trend towards lighter, smaller cars with correspondingly lighter, smaller motors with less cylinders, there has been a growing need for refinement of the engine mounts.

With the foregoing in mind, an object of the present invention is to provide a simple and effective rubber mounting which avoids cavitation phenomena, involving interferring noise, in the low-frequency range at large amplitudes caused by excitation of the engine due to the road surface or in the starting-up or stopping phase, and wherein optimum insulation in respect of the transmission of noise from the engine to the body work in the high-frequency range, at low amplitudes, is not detrimentally affected.

To achieve that object, the present invention generally provides that the partitioning wall is provided, in the region of its periphery, and on the side which is toward the rubber-elastic spring element, with a spring which is disposed in a prestressed condition between the peripheral wall and a support means extending in the region of the outer periphery of the petitioning wall, and that arranged on the side of the partitioning wall which is remote from the rubber-elastic spring element is a sealing means which extends over the periphery of the arrangement and which cooperates with a sealing surface of one of the end walls and which seals the compensation chamber relative to an annular space which is disposed radially between the partitioning wall and the peripheral wall of the pressure chamber, wherein the spring or the support means has recesses which form a constant communication between the pressure chamber and the annular space. The pressure chamber is, of course, the chamber which includes the rubber-elastic peripheral wall portion, and the compensation chamber is the chamber disposed on the other side of the partitioning wall, and typically constructed with a bellows or concertina-type membrane.

An advantage in an above described arrangement is that, in the normal range of operation of the mounting, the functions of noise insulation and damping are not affected, whereas at large amplitudes at which cavitation occurs, there is a fluid exchange effect, with a bypass action relative to the damping passage. Such situations often occur in the phase of starting up and stopping an engine, and when the engine is subjected to substantial excitation by virtue of the road surface. The reduced pressure which is produced in the chamber under cavitation conditions acts in opposition to the prestressing force of the spring so that the partitioning wall, with its sealing means, moves away from the sealing surface and permits an exchange of fluid past the sealing means, through the annular space and the recesses. The axial distance covered by the partitioning wall not only permits a fluid interchange effect, but in addition the volumes of the two chambers also change as a result thereof. An advantage in that connection is that the volume of the chamber in which there is a reduced pressure is decreased so that the action also acts in opposition to the cavitation phenomena. When the movement is reversed, the spring is released of the added stress, and the bypass closes.

An advantageous embodiment provides that the partitioning wall is arranged radially within a support ring, and that the spring which comprises rubber or another elastomer is vulcanized to the support ring.

Another feature provides that the spring for the partitioning wall is of L-shaped or T-shaped cross section, and the recesses or openings are disposed in the limb portion thereof, which is in a prestressed condition and which bears against the support means. The openings or recesses are so selected that, when the bypass opens, sufficient fluid can flow through the recesses by way of the annular space.

In accordance with a particularly advantageous construction, the sealing means is of substantially square or rectangular cross section and is fixedly connected to the previously mentioned support ring. For purposes of satisfactory functioning, the sealing means is associated with and fixedly connected to the partitioning wall. However, it would also be possible for the sealing means to be a component on the opposite side, and for the part of the partitioning wall to be formed as a sealing seat.

Another feature provides that the sealing means has at least one projection which extends in the direction of the sealing surface and which is formed as a sealing lip which extends over the entire periphery. In such an arrangement, the sealing lips may advantageously and easily be in the form of, for example, half-round projections so as to give line contact at the sealing seat, such line contact ensuring a satisfactory sealing action so that, due to the prestressed condition obtaining in the normal range of operation, there cannot be any interchange of fluid past the sealing means and through the annular space, which could adversely affect the damping qualities of the rubber mounting.

In order to ensure ease of production and manufacture of the system, a particularly desirable construction provides that a rigid annular member which is fixed in the clamping region is provided as the support means for the partitioning wall spring and/or as the sealing surface. With such a construction, it is readily possible for the annular members, together with the partitioning wall, to be formed as a separate component, and fitted into the mounting as a unit.

Another embodiment provides that the support means is a component of the connecting flange or the annular member. In that arrangement, the spring can be supported directly, without additional members.

A preferred embodiment of the invention is described hereafter in conjunction with the appended drawings.

DESCRIPTION OF PREFERRED EMBODIMENTS

Figure 1:
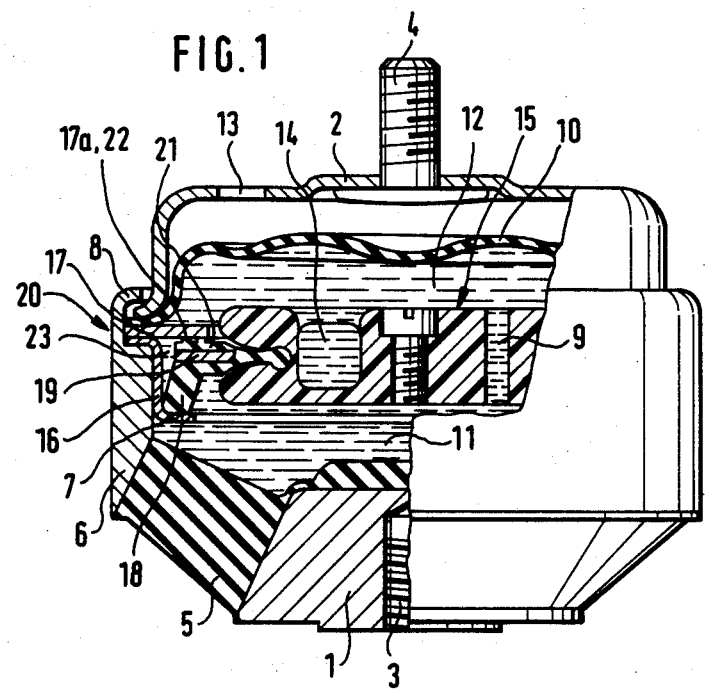
FIG. 1 is a view of an engine mounting in longitudinal section in the axial direction.

The engine mounting illustrated in FIG. 1 has two end walls 1 and 2 which are disposed opposite to each other in the axial direction. The end wall 1 is provided either with a screw threaded bore 3 or with a screw threaded pin (not shown), for securing purposes. Similarly, the end wall 2 which is in the form of a cover or top plate carries a securing pin 4.

The peripheral surface of the end wall 1 is of a conical or tapered configuration, and vulcanized thereto is a peripheral wall which is in the form of a rubber-elastic spring element 5 and which is joined to a connecting flange 6 at the connecting surface of the peripheral wall 5 which is remote from the end wall 1. The connecting flange 6 also includes a flange rim portion 8 which accommodates the partitioning wall 15, a bellows or concertina member 10, and the end wall 2 which is in the form of a cover plate.

The engine mounting therefore has two chambers 11 and 12 which are separated from each other by the partitioning wall 15 and which contain damping fluid. The chamber 11 is in the form of a pressure chamber, while the chamber 12 is in the form of a compensating chamber for receiving volume in an approximately pressureless mode. At least one vent opening 13 is provided in the end wall 2.

Either an annular through-flow passage 14 and/or one or more through-flow bores 9 are provided as throttle means in the partitioning wall. The throttle means is operative in the normal working range of the mounting.

The partitioning wall 15 is carried in the clamping region 20 by way of the support ring 19, the rubber spring 18 and the sealing means 21. In that arrangement, the annular member 16 serves as a support means 7 for the rubber spring 18, with the annular member 17 cooperating as a sealing surface 17a with the sealing means 21. In order to ensure a satisfactory seal, semicircular projections 22 are provided on the surface of the sealing means 21. The annular space 23, in conjunction with the recesses or openings 24 (FIG. 3) in the rubber spring 18, serves as a through-flow passage for the damping fluid upon interchange of fluid from the compensating chamber 12 to the pressure chamber 11. Such interchange of fluid occurs whenever a reduced pressure obtains in the pressure chamber 11, such reduced pressure overcoming the prestressing of the rubber spring 18 so that the sealing means 21 moves off its sealing surface 17a. After the pressure compensation has taken place in that way, the prestressing of the rubber spring 18 becomes effective again and, after the sealing means 21 seals off against the sealing surface 17a, the mounting is restored to its normal operating range.

Figure 2:
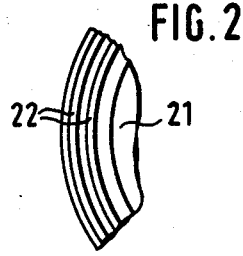
FIG. 2 is a plan view of the sealing means.

FIG. 2 shows a sealing means 21, as an individual component, with the projections 22 projecting on the top side of the sealing means 21, in the form of sealing lips.

Figure 3:
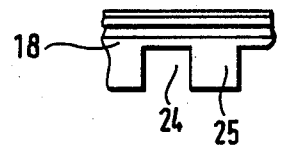
FIG. 3 is an elevational view of a partitioning wall spring in the form of a rubber spring.

FIG. 3 shows a view of a rubber spring 18 with the openings 24 distributed around the periphery thereof, and the support limb portions 25 which remain as a result of the formation of the openings 24. Instead of openings 24 in rubber spring 18, there could be openings in support means 7 for communicating annular space 23 and pressure chamber 11.

Having thus described preferred embodiments of my invention, I claim:

1. A resilient engine mounting device having hydraulic damping for vibrationally damping a motor vehicle engine, said mounting device having at least a longitudinal axis along which damping is prevalent, said mounting device having a body with opposite end portions having mounting means thereat, said end portions being aligned with said longitudinal axis and at either end of said device;
  said device being of the type including an elastomeric structure being attached to said opposite end portions;
  a first chamber (11) and a second chamber (12);
  said two chambers for containing damping fluid, said first chamber being defined, at least in part, by said elastomeric structure and a first of said end portions, said two chambers being disposed one adjacent another along said longitudinal axis;
  said two chambers being separated by partition means, said partition means having a resilient outer, circumferential, peripheral portion and a movable, rigid inner portion, said inner portion being disposed and suspended within said outer, peripheral portion of said partition means, said outer, peripheral portion having a flexible portion;
  said outer, peripheral portion having a portion disposed to separate said body into said two chambers;
  said second chamber (12) having means (10) for relieving pressure therein;
  said first chamber (11) having means, including said elastomeric structure and said first end portion and said partition means, for creating a pressure substantially below ambient pressure around said mounting device by movement of said first end portion away from said second end portion during operation and for tending to cavitate said damping fluid in said first chamber;
  at least one throttle means being disposed in said rigid inner portion for providing fluid communication between said chambers;
  said outer peripheral portion comprising a spring;
  said spring comprising:
    (a) an axially, pre-stressed region (18) pre-stressed along said longitudinal axis;
    (b) said pre-stressed region (18) having a sealing surface (17a); and
    (c) a radial region (21) extending radially from and being connected to said rigid inner portion (15);
  holding means (7) disposed on said body (20);
  annular means (23) disposed adjacent said holding means (7);
  said pre-stressed region (18) being in contact with and held by said holding means (7);
  said radial region (21) and said pre-stressed region (18) sealing off said second chamber (12) from said annular means (23) and said first chamber (11), said pre-stressed region being pre-stressed for exerting a force against said radial region;
  permanent fluid communication means (24) for permanently connecting said first chamber (11) and the said annular means (23) with one another;
  said pre-stressed region and said radial region being closed to flow of fluid between said two chambers, at least when said pressure difference between said first chamber and said second chamber is substantially zero;
  said pre-stressed region and said radial region opening to permit fluid flow therethrough unidirectionally from said second chamber to said first chamber, only in a first predetermined pressure differential range that begins to relieve pressure between said two chambers to minimize cavitation of damping fluid in said first chamber;
  said first predetermined range being defined by a first pressure in said first chamber below ambient pressure about said device and any pressure being yet lower below said ambient pressure than said first pressure;
  said pre-stressed region and said radial region being substantially closed to fluid flow at pressures in said first chamber being different from said first predetermined range and when a pressure difference between said first chamber and said second chamber is substantially zero.

2. A resilient engine mounting device according to claim 1, wherein the rigid inner portion (15) is surrounded radially by a back-up ring (19) and the spring (18) is vulcanized onto the back-up ring (19).

3. A resilient engine mounting device according to claim 1, wherein said spring is made of rubber.

4. A resilient engine mounting device according to claim 1, wherein said spring comprises an elastomer.

5. A resilient engine mounting device according to claim 1, wherein said spring has a cross section in a shape chosen from a member of the group consisting of an L shape and a T shape.

6. A resilient engine mounting device according to claim 1, wherein said radial region (21) has at least one projection (22) running completely around a circumferential portion of said radial region (21), a sealing lip forming a seal with a sealing surface (17a).

7. A resilient engine mounting device according to claim 1, whereby said holding means (7) comprises a rigid ring body (16) fixed in said body (20).

8. A resilient engine mounting device according to claim 1, including a ring body (17) held in said mounting device body (20) as a sealing surface (17a).

9. A resilient engine mounting device according to claim 1, said holding means (7) comprises a connecting flange (6).

* * * * *